Oct. 30, 1923.
F. G. FOLBERTH ET AL
1,472,644
WINDSHIELD CLEANER
Original Filed May 11, 1921
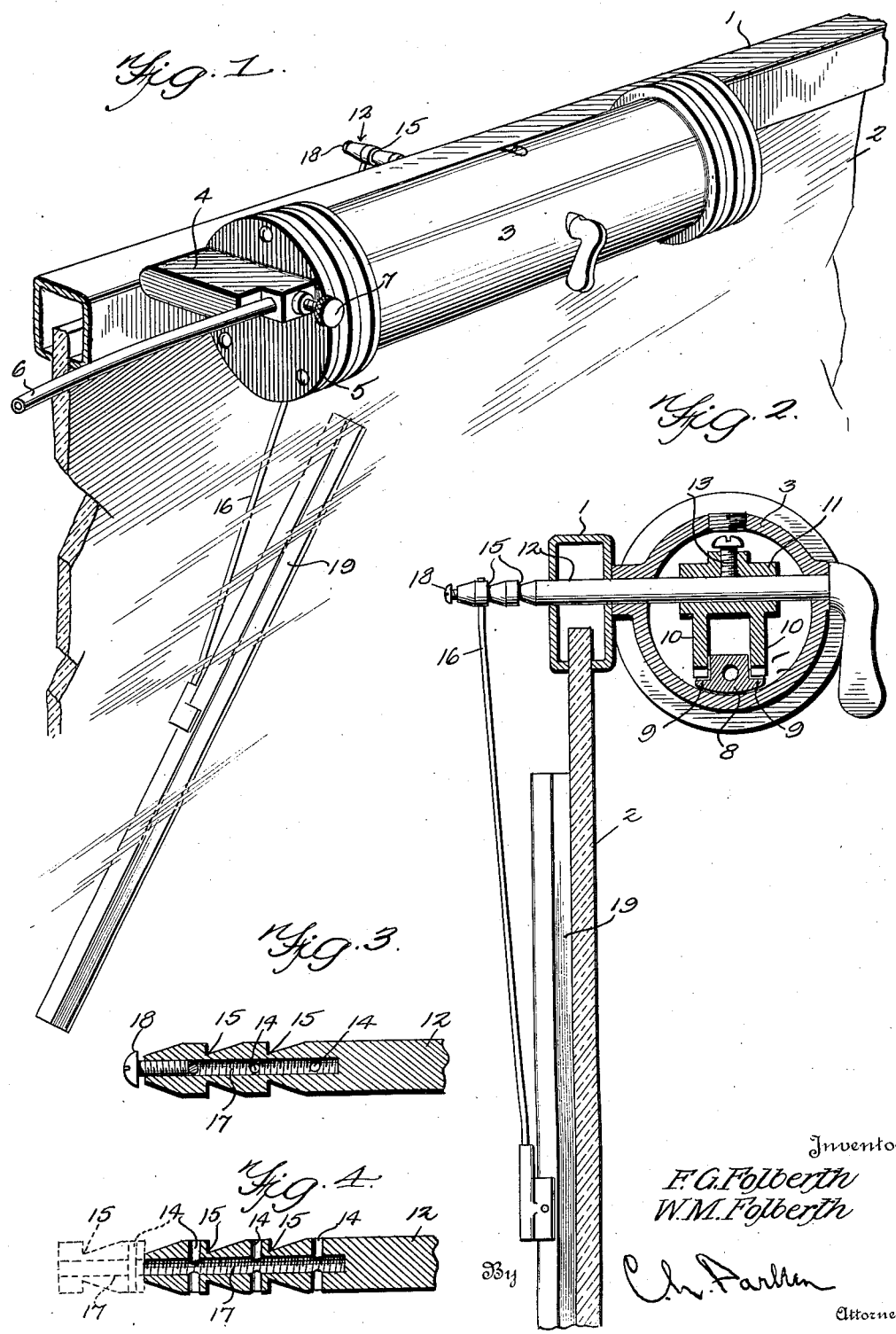
Inventor
F. G. Folberth
W. M. Folberth Patented Oct. 30, 1923.

1,472,644

UNITED STATES PATENT OFFICE.

FRED G. FOLBERTH AND WILLIAM M. FOLBERTH, OF CLEVELAND, OHIO, ASSIGNORS TO THE FOLBERTH AUTO SPECIALTY COMPANY, OF CLEVELAND, OHIO, A CORPORATION OF OHIO.

WINDSHIELD CLEANER.

Original application filed May 11, 1921, Serial No. 468,486. Divided and this application filed November 17, 1921. Serial No. 515,911.

*To all whom it may concern:*

Be it known that we, FRED G. FOLBERTH and WILLIAM M. FOLBERTH, citizens of the United States, residing at Cleveland, in the county of Cuyahoga and State of Ohio, have invented certain new and useful Improvements in Windshield Cleaners, of which the following is a specification.

This invention relates to windshield cleaners and is a division of our copending application Serial No. 468,486, filed May 11, 1921. In the said application we have disclosed and claimed a motor for windshield cleaners comprising a cylinder having a pair of spaced pistons mounted therein, a web connecting the pistons, a pair of racks arranged on said web, a cleaner shaft extending transversely of the cylinder and a pair of segmental gears carried by said shaft and meshing with said racks.

In the application there is also disclosed, but not claimed, means for connecting the cleaner rod to the cleaner shaft to permit adjustment of the cleaner element for windshield frames of varying thickness. As disclosed the outer end of the shaft is provided with a plurality of circumferential grooves and is further provided with transverse openings arranged outwardly of each groove. When the windshield cleaner is being assembled, it is necessary to adjust the cleaner rod to the windshield with a proper degree of friction to remove moisture and the like therefrom, but to permit movement of the cleaner element over the windshield frame. A certain amount of adjustment may be obtained by bending the cleaner rod, but where a larger adjustment is desired the cleaner rod is placed in a different opening in the shaft. After the cleaner rod has been placed in position the projecting end of the shaft may be broken off at one of the grooves.

In the accompanying drawings we have shown one embodiment of the invention. In this showing—

Figure 1 is a fragmentary perspective view of a windshield and windshield frame showing the invention applied, Figure 2 is a transverse vertical sectional view, Figure 3 is a detail sectional view of the outer end of the cleaner shaft, and, Figure 4 is a similar view showing the broken end of the shaft in dotted lines.

Referring to the drawings, the reference numeral 1 designates a windshield frame adapted to receive a windshield 2 of glass or other transparent material. The windshield cleaner consists of a cylinder or motor 3 mounted on the windshield frame in any suitable manner and provided with pistons (not shown) adapted to reciprocate therein. Suitable valve mechanism, actuated by the movement of the pistons, is arranged to connect opposite ends of the cylinder with a chamber 4 mounted on cylinder head 5. This chamber is in communication with a source of pressure or suction by means of conduits 6 and is provided with a control valve 7. The pistons are connected by a web 8 having racks 9 formed thereon adapted to mesh with segmental gears 10 carried by a sleeve 11. A cleaner shaft 12 extends transversely of the cylinder and projects through the windshield frame. Sleeve 11 is arranged on this shaft and is maintained in position by set screw 13.

The shaft is provided with a plurality of transverse openings 14 adjacent its outer end and is further provided with circumferential grooves 15 arranged outwardly of each of said openings. A cleaner rod 16 is adapted to be arranged in one of said openings and the shaft broken off at the groove beyond the opening in which the cleaner rod is arranged. The openings 14 are intersected by a longitudinally threaded bore 17 which is adapted to receive a set screw 18, the set screw engaging the cleaner rod to prevent displacement thereof (see Figure 3). A cleaner element 19 is carried by the cleaner rod.

From the foregoing description it will be apparent that the cleaner rod may be initially adjusted to the windshield by arranging it in either one of the openings 14. This provides a rough adjustment and a finer adjustment may be obtained by bending the cleaner rod. If the cleaner rod is inserted in any one of the openings other than the outermost opening 14 the projecting portion of the shaft is broken off at the next adjacent groove by grasping the end of the shaft in a pair of pliers and applying sufficient pressure to break it. This produces an outer end having a finished appearance and permits the use of a standard length set screw to retain the cleaner rod in position regardless of the opening in which the cleaner rod is arranged.

It is to be understood that the form of our invention herewith shown and described is to be taken as a preferred example of the same and that various changes in the shape, size, and arrangement of parts may be resorted to without departing from the spirit of our invention or the scope of the subjoined claims.

Having thus described our invention, we claim:

1. In a windshield cleaner, a motor, a cleaner shaft operated by said motor and a cleaner rod adapted to be secured to said shaft, said shaft being provided with a plurality of openings adjacent its outer end for selective reception of said cleaner rod, and a circumferential groove arranged outwardly of one of said openings, whereby the section of said shaft outwardly of said groove may be readily removed.

2. In a windshield cleaner, a motor, a cleaner shaft operated by said motor and a cleaner rod adapted to be secured to said shaft, said shaft being provided with a plurality of openings adjacent its outer end for selective reception of said cleaner rod, and a weakened portion arranged outwardly of each of said openings whereby the section of said shaft outwardly of a selected one of said openings may be readily removed.

3. In a windshield cleaner, a motor, a cleaner shaft operated by said motor and a cleaner rod adapted to be secured to said shaft, said shaft being provided with a plurality of openings adjacent its outer end for the reception of said cleaner rod, a weakened frangible portion arranged outwardly of one of said openings, and a longitudinal bore for the reception of suitable securing means adapted to engage the cleaner rod.

4. In a windshield cleaner, a motor, a cleaner shaft operated by said motor, a cleaner rod adapted to be secured to said shaft, said shaft being provided with spaced weakened portions for ready severance, and means to secure said rod to said shaft inwardly of any of said weakened portions.

5. In a windshield cleaner, a motor, a cleaner shaft operated by said motor, a cleaner rod adapted to be secured to said shaft, said shaft being provided with a weakened portion for ready severance, and means to secure said rod to said shaft selectively inwardly or outwardly of said weakened portion.

In testimony whereof we affix our signatures in presence of two witnesses.

FRED G. FOLBERTH.
WILLIAM M. FOLBERTH.

Witnesses:
    MAXWELL F. FOURNIER,
    HERMAN O. LEHR.